(12) United States Patent
Leary (10) Patent No.: US 8,224,790 B2
(45) Date of Patent: Jul. 17, 2012

(54) INFORMATION PROCESSOR ARRANGEMENT

(75) Inventor: Richard Leary, Tamworth (GB)

(73) Assignee: Advanced Forensic Solutions Limited, Tamworth (GB)

( * ) Notice: Subject to any disclaimer, the term of this patent is extended or adjusted under 35 U.S.C. 154(b) by 0 days.

(21) Appl. No.: 12/797,528

(22) Filed: Jun. 10, 2010

(65) Prior Publication Data

US 2011/0010399 A1    Jan. 13, 2011

Related U.S. Application Data

(63) Continuation of application No. 11/575,955, filed as application No. PCT/GB2005/003730 on Sep. 26, 2005, now abandoned.

(30) Foreign Application Priority Data

Sep. 24, 2004   (GB) ................................. 0421284.1

(51) Int. Cl.
  G06F 7/00        (2006.01)
  G06F 17/30       (2006.01)
  G06F 17/00       (2006.01)
(52) U.S. Cl. ....................................... 707/687; 707/803
(58) Field of Classification Search .................. 707/791, 707/797, 802, 786, 687; 711/203; 709/225
See application file for complete search history.

(56) References Cited

U.S. PATENT DOCUMENTS

| | | | |
|---|---|---|---|
| 5,335,265 A * | 8/1994 | Cooper et al. | 455/410 |
| 5,966,431 A | 10/1999 | Reiman et al. | |
| 6,516,416 B2 * | 2/2003 | Gregg et al. | 726/8 |
| 7,120,934 B2 * | 10/2006 | Ishikawa | 726/23 |
| 7,406,159 B2 * | 7/2008 | Russell | 379/114.14 |
| 2002/0066034 A1 | 5/2002 | Schlossberg | |
| 2005/0021476 A1 * | 1/2005 | Candella et al. | 705/64 |
| 2005/0060287 A1 * | 3/2005 | Hellman et al. | 707/2 |
| 2006/0041508 A1 | 2/2006 | Pham et al. | |
| 2007/0287417 A1 | 12/2007 | Abramovich | |
| 2007/0294271 A1 | 12/2007 | Bammi et al. | |

OTHER PUBLICATIONS

Chen H. et al, "Crime data mining: a general framework and some examples," Computer IEEE Comput. Soc USA, vol. 37, No. 4, Apr. 2004, pp. 50-56.
Jain A.K. et al, "Data clustering: a review," ACM Computing Surveys, ACM, New York, NY, US, vol. 31, No. 3, Sep. 1999, pp. 264-323. Kent W, "A Simple Guide to Five Normal Forms in Relational Database Theory," Communications of the Association for Computing Machinery, ACM, New York, NY, US, vol. 26, No. 2, Feb. 1983, pp. 120-125.
Yu-Chi Ho et al: "Simple explanation of the no free lunch theorem of optimization", Proceedings of the 40th IEEE Conference on Decision and Control. (CDC). IEEE, US, vol. 5, Dec. 4, 2001, pp. 4409-4414.
Cordula Kessler, European Search Report for EP 10167868, May 26, 2011.

* cited by examiner

Primary Examiner — Pierre Vital
Assistant Examiner — Sabana Rahman
(74) Attorney, Agent, or Firm — Chernoff, Vilhauer, McClung & Stenzel (57) ABSTRACT

Irregular links and relationships in a data set may relate to fraudulent actions or identify deception or risk assessment or knowledge generation but may be identified by simple superficially unlinked actions. Thus, for example a claimant may claim through an address using one telephone number but contact the insurer for that claim using a different telephone number. By pooling all the information received, including all telephone numbers, unusual or irregular or fraudulent leads can be identified by establishing telephone numbers or other gateway cluster nodes for each dataset such that supposedly unrelated claims can be matched and therefore be more closely scrutinised. The information processor arrangement may create a cascade of clusters for an as presented data set which can be configured through cluster nodes to allow better identification of suspect activity or for better analysis profiling.

17 Claims, 1 Drawing Sheet

FIG. 1

INFORMATION PROCESSOR ARRANGEMENT

CROSS-REFERENCE TO RELATED APPLICATIONS

This is a continuation of U.S. patent application Ser. No. 11/575,955 filed Jun. 26, 2007, now abandoned, which is a national stage application filed under 35 USC 371 based on International Application No. PCT/GB2005/003730 filed Sep. 26, 2005, and claims priority under 35 USC 119 of United Kingdom Patent Application No. 0421284.1 filed Sep. 24, 2004.

BACKGROUND OF THE INVENTION

The present invention relates to information processor arrangements and in particular arrangements utilised in order to identify by processing, management, analysis and manipulation unexpected links and new knowledge, risk and uncertainty in and between data in a data set.

Ever increasing use of financial and other services leads to a vast volume of data being collected. If this data is to be useful to the enterprise and connected enterprises for which it was collected it needs to be analysed. The methodology described in this application provides an efficient and effective means to discover knowledge risk and uncertainty that may be important to the enterprise or connected enterprise in which it was collected to be analysed. Furthermore, this data may be held by a number of service providers with varying degrees of accessibility to others who may be competitors or there may be other reasons defeating data sharing pools and the information itself may be of variable reliability. For example, with respect to an insurance claim, typically a claimant will be asked to provide particular details on a claim form and further information may become available through subsequent contact in respect of further details provided by the claimant or the insured, and possibly through interrogative techniques such as recordal of the telephone number and other data upon which the claimant calls the insurer or the postal sorting office from which paperwork is despatched. In these circumstances it is easy for a fraudster or other persons wishing to perform irregular activities to hide those activities within the multitude of data as well as/or use false information or misleading information for the purpose of evading detection as a fraudster. For example, this methodology helps to identify persons engaging in "Identity Deception" by presenting or publishing their details to recipients rather than proving them in the course of their transaction. Hence, the methodology enhances the ability of the organisation to evaluate the authenticity of a claim made as to identify or alternatively, that some fact or event existed in a given form or state. It is also necessary for some organisations to demonstrate compliance with their regulatory obligations and due diligence responsibilities.

The challenge with respect to investigatory and regulatory bodies, organisations and authorities is to identify within the multitude of information those transactions or activities which require more detailed personal and iterative consideration. Clearly, with respect to so called relational databases, it is possible to define Boolean logic strings in order to provide the search results from the database. Unfortunately, such an approach is either too focused or too diverse generally to identify those most questionable of transactions or activities from the multitude. It will be understood that investigatory resources and those involved in generating business intelligence, exercising due diligence and risk management are limited such that in situations where at the start of an investigation there is a high degree of uncertainty and complexity surrounding the details of the potential irregular activity, it is difficult to be certain that a high proportion of such activities will be detected. As such, this methodology is not limited to Investigatory Resources and equally applies to business intelligence, exercising due diligence and risk management. Investigator in this respect should be construed as meaning any person or body of persons engaged in investigation, business intelligence, exercising due diligence and risk management. For example, an investigator may be aware of known modes of fraudulent activity, but cannot be certain that other forms of activity are not being performed and secondly the most appropriate data items which will be key to detection of a fraud or activity have been identified. What is required is an analytical tool which generates meaningful clusters of information rather than individual items of information. Furthermore, the number and type of clusters formed should be adjustable dependent upon the nature of the fraud or activity and the resources available. In such circumstances it may be possible to identify particular instances of fraudulent activity and so define these clusters in ways necessary in order to identify that activity or alternatively provide a risk assessment with respect to provision of services or otherwise based upon the ease with which fraudulent or irregular activity can be identified with particular information input checks.

Increasing use of remote provision and validation of services has increased the reliance upon individual identification. However, and inevitably, there is an increase in identity theft or use of alias names and other false personal or other details whereby individuals represent themselves as somebody else in order to gain services or goods in the wrongfully identified person's name. Furthermore, it is possible to have a cascade of identity thefts or alias names and other false personal or other details which directly or indirectly link the perpetrator of such fraud or irregular activity to other instances of activity or scenarios or data of interest from themselves.

Service and goods providers and those charged with responsibility for investigation, analytical work such as regulatory compliance, risk assessments, crime investigation and fraud detection need to be able to identify those transactions or passages of activity which are most likely to be as a result of fraud or unacceptable behaviour from a given mass of data. Furthermore, this identification is generally time dependent in that activity continues and it would be unacceptable in most commercial situations (or other situations where deployment of finite resources has to be carefully managed over time) to delay provision of services or goods over a prolonged period to investigate a large number of potential instances of fraud or inappropriate activity. Furthermore, time changes context and so knowledge discovery as a process needs to be both content aware and context driven. (Knowing what is present and discovering what it means or could mean given certain conditions).

The problem can be summarised in the following way. Collections of information described are typically comprised of many different variables. These datum and variables are collected by different enterprises because they are thought by those charged with that responsibility to represent key items of information important to the enterprise as a whole. Therefore, the context in which the collection process operates is dictated at some time in the past and by reference to some given perspective of what was relevant to the enterprise at that time. The way these datum and variables are related together in the process of an analysis is fundamentally important to the extraction of knowledge and the identification of missing information and misleading information. Different combinations of information produce different results but even in small collections of information a problem is presented: that is, the number of possible combinations of two or more items of information is often so large that problems of scale and utility prevail. For example, the number of possible combinations of two or more items of information in a given collection of data can be calculated on the basis of an exponential equation of $2n(-n+1)$. This can produce massive numbers incapable of being processed sequentially in an efficient manner. If "possibly relevant but no currently represented" information in the collection is also included in this calculation then the resulting problem is even greater. Furthermore, time is an important factor because time changes context and, in turn, context changes meaning. It is important to be able to use the results of the process as new inputs. This provides 'Feedback' information to the system employed which in turn allows the processing to be context driven. This means that any solution must take account of the exponential combination of different data items and the influence time has on context. A processor therefore need to reflect this.

SUMMARY OF THE INVENTION

In accordance with the present invention there is provided a method of identifying irregular or fraudulent links in a dataset, the method comprising the steps of:
(a) collecting a dataset in the form of information entities interlinked by reference to each other; and the context in which the information entities are taken
(b) defining those irregular or fraudulent links to be identified by reference to an information entity as a relevance model that facilitates the detection of relevant scenarios and relationships in the form of direct links and indirect links.
(c) defining a plurality of gateway cluster nodes for the dataset, each cluster node being one of the information entities whereby each information entity is considered to determine its links with other information entities until the so linked information entities are resolved respectively upon linkage to the gateway cluster node as a member of a cluster referenced by the gateway cluster node, each member comprising a string or network of links to the gateway cluster node; and
(d) selection of those clusters by reference to the relevance model and determining whether the number population in the selected cluster respectively meet preset specific search criteria or repeating step (c) specifically upon the cluster with cluster nodes defined by information entities other than the gateway cluster node until the preset specific search criteria are achieved.

Also in accordance with the present invention there is provided an information processor arrangement comprising
(a) a relational database defining types of information entities and is interlinked with each other directly or indirectly,
(b) means to define links as a relevance model, each link predictive of an irregular or fraudulent activity;
(c) means to define a plurality of gateway cluster nodes comprising one of the information entities and means to scheme links from each information entity to each gateway cluster node and that network of schemed links defining a member of a respective cluster referenced by the gateway cluster node, means to select clusters by reference to the relevance model as predictive of irregular or fraudulent activity and means to determine whether each selected cluster meets pre-set specific search criteria and means, if the selective cluster does not meet the pre-set search criteria, to analyse that selected cluster by definition of further gateway cluster nodes and use of the means to scheme links to the further gateway cluster nodes to provide sub clusters for comparison with the relevant model until such sub clusters meet the pre-set search criteria.

Generally, a minimum and/or maximum number of gateway cluster nodes are defined in order to provide adequate analysis of the dataset to determine presence of the irregular or fraudulent links. This can be automated by building into the processor a means for information to be:
(a) Received & stored
(b) Processed by reference to a Dynamic Re-Programmable Arrangement and Model of Gateway Cluster Nodes.
(c) Results of the processing are fed back into the Received and Stored section. These act as "Feedback Loops" to inform and prompt the use of a different Model of Gateway Cluster Nodes.
(d) Process begins again as at (a) above between information entities.

Preferably, a minimum and/or maximum number of links between information entities is prescribed for resolution as a member of a cluster referenced by the gateway cluster node. Typically, links will be defined relative to a hierarchy relative to the gateway node. Furthermore, such hierarchy may allow links between information entities to be lateral that is to say of information entities of the same type e.g. name or telephone number or upward or downward that is to say telephone number may be downward and then an upward link would be back to the same information entity type as that of the gateway cluster node that is to say name. Possibly, some gateway cluster nodes may be given a ranking or priority relative to other gateway cluster nodes.

The dataset may be and/or by reference to the results of the processing. The process is therefore dynamic and self evolving over time and by reference to the information feed and model used. Information entities are wide ranging and not limited to those mentioned. They may be terms, names, references, numbered references, descriptions and so on.

Information entities and attributes will comprise many different types and classes of information depending upon the field of operation but examples would be address and/or name of individuals and/or telephone numbers and/or documentation reference numbers or types or any information linked to or providing reference to an activity or service or goods such as for example a motor vehicle registration number.

Generally, the dataset may be continuously updated and steps (c) and (d) performed in order to provide clusters. Possibly, steps (c) and (d) are performed upon the whole updated database. Alternatively, steps (c) and (d) are performed upon predetermined selected clusters updated as part of the dataset.

Normally, at least one sub-cluster is provided in order to achieve the predetermined specific search criteria.

Generally the predetermined specific search criteria is member population number value in a cluster or sub-cluster or sub-sub-cluster as appropriate.

Typically, clusters are analysed to alter the means for collection of a dataset in terms of the information entities required. Possibly, the dataset comprises mandatory information entities and voluntary information entities. Additionally, the dataset may incorporate information entities achieved by interrogation of available sources rather than passive presentation of such information entities by individuals. This is intended to facilitate the use of an approach in which "evidence about evidence" provides new perspectives on the meaning of the evidence or data as a whole Possibly, the clusters are analysed to identify expected links for elimination or illumination of members in the cluster and therefore reduce remainder cluster member populations for determination of the preset specific search criteria.

Possibly, clusters are grouped for mutual confirmation of irregular or fraudulent links by similarity of gateway cluster node and subsequent cluster node linkage similarity or reciprocity of linkage route.

Normally, the gateway cluster links are specifically determined for identification of the irregular or fraudulent links prior to performance of the method. However, these can be re-arranged and changed over-time as new knowledge is discovered. Changing the gateway nodes in the light of new knowledge allows the analytical process to evolve within an iterative process of discovery over-time and in-line with a changing context.

Additionally, gateway cluster links may be altered by the results of clusters relative to the preset specific search criteria in an iterative feedback adaptation process.

Additionally, in accordance with the present invention there is provided a processor arranged to perform the steps as defined in the method above.

Further additionally in accordance with the present invention there is provided a memory storage device incorporating instructions to perform the method as defined above when uploaded into a processor device for performance of the method.

Advantageously in accordance with the present invention there is provided a memory storage device storing clusters or sub-clusters or sub-sub-clusters provided by the method as defined above. The results of different combinations of gateway nodes results in different conclusions. Comparative analysis of these different conclusions in their own right provides a range of perspectives and a range of possible answers to the problem. The analyst can then engage in a process of differentiation based on the evidence at hand and the objectives in mind.

Analysis and synthesis involve the skilled examination of facts and inferences drawn from information we have as well as information we do not yet have. In short, it is a question of unravelling the significant from the insignificant, assessing the credibility, relevance and weight as well as assessing the reliability of conclusions in order to help us to discover new explanations upon which there is some doubt. It is upon this pretext of doubt that fraudsters base their activities. It will be appreciated that fraudsters would be rapidly identified if they identify themselves clearly as such, but inevitably attempt to hide their actions by subterfuge and indirect connections. On the one hand providing sufficient information to persuade but on the other hand providing as little information as possible that would cause the detection of their fraudulent activity to be discovered. In short, those involved in fraudulent or subversive activity prevail on the basis of their ability or attempts at leaving as few traces as possible of fraud but many traces of apparently legitimate information.

Unfortunately, in order to meet the necessary legal requirements of evidence, there is a requirement for detailed analysis of transactions, etc and this cannot be performed on a large number of potential malicious activities. In such circumstances it is necessary to provide an information analysis arrangement in which large collections of information can be analysed in order to identify a manageable number of situations at which there is a prescribed level of probability of irregular or fraudulent activity. In such circumstances, each piece of information adds support to particular conclusions in an iterative manner to enable elimination or provide further incentive for deeper investigative understanding. Clearly, strategies can be devised for questions and question sequencing to enhance investigations, but nevertheless when based upon simple Boolean logic and relational databases requires significant computational time with little iterative improvement for subsequent investigations other than adding further sorting or filtering factors.

Sequencing questions in strategic ways can enhance this process. Therefore, evidence enables an inquirer to rule out possibilities thereby reducing uncertainty. Investigations and analysis involves the discovery and testing of new lines of enquiry, hypotheses, evidence and arguments, as well as the linking of evidence to hypotheses. Discovery in its turn involves a number of activities; analysis, synthesis, questioning, reasoning, and composition and decomposition of facts, evidence and potential explanations. Unravelling the significant from the insignificant, assessing the credibility, relevance and weight of evidence, analysing, the validity of conclusions, are all important for helping us discover new explanations for an improved understandings of matters of which we are in doubt. While all these activities involve creative acts, they also stand to benefit greatly from careful logical attention and analysis. Formal strategies can enhance our imaginative reasoning capabilities. The processor presented here is based upon an ability to undertake this process by examining different sequences of information in the form of questions, answers, relationships but over time and by virtue of different time driven contexts. The methodology here uses iterative processes and modelling designed to identify contextually relevant information. Iteration here means cyclical whereby inputs produce outputs and outputs in whole or in part become new inputs. This provides for the generation and exposition of a range of new analytical pathways.

Evidence and intelligence enables us to eliminate from an inquiry alternatives that may otherwise have held firm. This may have consequences for the conclusions drawn or the processing of lines of enquiry by investigators. Because a question can be a tacit request for knowledge, a question and answer step is an attempt to gain new knowledge over time in a reliable way. If the move is successful, and an answer is gained, then the investigator is provided with more knowledge than s/he possessed before. In this situation, the questioner is given new insights by which alternatives can be discarded and which need further attention in an inquiry. The sequencing of questions and answers as clusters based on node access is a central feature of the invention disclosed here.

Questions can be sequenced in different ways. A question reasoning towards answering some ultimate proposition (a principal hypothesis) may be better achieved by ordering questions into a number of "smaller" sequences of questions. Here, algorithms can be generated in sequences based upon aspects of the data subject of the enquiry. There is a difference between questions that if answered conclusively, would provide an answer to some ultimate proposition, and questions that can help as part of a sequence of questions aimed at reasoning towards the ultimate proposition.

Reasoning (application of algorithms) in smaller steps like this and by reference to different contexts can provide very powerful information that would not have been discovered by simply asking the question that 'goes for the jugular', that is to say by Boolean logic combinations of a relational database. Any flaw in the resulting evidence from that process may render the reliability of the answer flawed as well. This methodology exploits the ability to detect indirect relationships over extended and complex layers of information some of which are driven by the iterative. The complexity of these relationships defeats Boolean Logic and in most circumstances human reasoning. There are too many variables, too many layers of links. Usually, remoteness of relationships and links prevents their detection. By taking smaller steps, there is a degree of elasticity that is not found where a 'one step question to answer' is taken. This has major advantages in the reduction of uncertainty discussed later in this disclosure. One item of information that appears flawed in some way may not be fatal to the overall conclusion when the evidence is considered as a whole and emanates from a process where several questioning steps or algorithms were applied and results assessed as part of an overall strategy and methodology.

Modern procedures, systems and technology allow organisations to engage in the mass collection, storage and transfer of large quantities of information and for diverse purposes. Whilst the nature of the individual items of information in a collection amassed by an organisation is itself clear in terms of what the information is or represents, the knowledge contained within the information as a whole or in related networks of links is usually unclear. In other words, whilst identifying what a single item or category of information in a system represents is relatively simple, discovering what the information means in light of other information in the system is highly problematic.

The larger and more diverse the collection, the more unclear the information as a whole becomes. This is because the combination of large quantities of information creates a 'mathematical explosion' of possible connections between two or more items of information in the collection.

Although the possible number of combinatorial associations of two or more items of information in a collection can be calculated using factorial equations, the resulting number of associations is massive. This creates a problem computationally because even using the fastest, most powerful computers available, even relatively small collections of information can present an extremely large number of calculations to undertake to assess the number of possible combinations and associations involved and therefore the relationships the collection of information presents is likewise unclear. What may appear to be a collection of simple sets of information can often hide complex realities in terms of the relationships present in the information.

The number of possible associations of two or more items of information in a collection can be calculated on the basis of a factorial equation involving the total number of items calculated to $2n-(n+1)$. This is a massive number well beyond the analytical capability of humans and computers not programmed for the purpose attempting to simplify what may be complex relationships it may not be possible to reflect on the information to an extent that reveals complex associations in their collections of information. Even when attempts are made at doing so, these are frustrated by the possible number of associations and combinations present. The problem is onerous and would need extremely powerful computing power to explore all possible associations and combinations. It is therefore not possible to conveniently extract useful knowledge from a collection of information. Thus, general analysis arrangements resort to simple queries involving the search for a match between two items of data.

Science and technology has concentrated on the development of methodologies for the collection and storage of information as opposed to the development of reliable methods that aid users in revealing and interpreting knowledge from information.

Different disciplines, professions and domains use information for different purposes and in different ways. Information does not speak for itself, it needs to be managed and filtered as part of both an objective and subjective process of interpretation.

It is important to recognize that it is not only the information that is possessed that is important it is also the information that is not possessed but ought to be. In this way, the present arrangement concentrates not only on the information possessed by a system or user but also the information (later knowledge) that is missing or suspected to be missing which will be required by more focused iterative investigation. For example, a fraudster is not likely to show connections to earlier frauds but there may be indirect associations through a telephone number or common address or other cross relationships.

These relationships may be remote and therefore non-obvious. However, when detected using the methodology described here, the overall conclusion is revealed and becomes apparent. Revealing a non-obvious link can in turn lead into 'obvious links'.

The present invention incorporates to varying degrees the following features.

1. Management of large collections of information in a way conducive to the generation of contextual knowledge as opposed to simple storage and querying based on matching discrete items of information with other discrete items of information;
2. Dynamic analytical and questioning procedures designed to reduce uncertainty and aid discovery not only of what should or currently is known but also what they do not know but need to know;
3. Ability to design, adapt, employ and re-assess algorithms for use in knowledge discovery as the process unfolds and emerges over time;
4. Dynamic, adaptive cyclical information processing of both queries and data to reveal relationships of interest;
5. Ability to use ranges of algorithms and make comparative assessments of resulting knowledge;
6. Ability to use probabilistic querying to assess relative weights of results;
7. Ability to develop links and networks of information based on information possessed as well as information that is missing using virtual node creation and modelling;
8. Visualisation of results to aid the user design and adapt appropriate algorithms for future knowledge discovery.
9. The ability to use results as 'prompts' for adapting or designing new algorithms;
10. Systematic, automated management process for knowledge discovery including the application of ranges and types of algorithms to the data collection;
11. Domain Modelling Process;
12. Entity Relationship Modelling Process;
13. Query Modelling Process;
14. Recognition that time affects the relevance and value of information as well as the need to make decisions quickly and economically.
15. Reporting and visualisation process of results.

There are two central components of the present arrangement and method.

1. Capture, Automated Analysis & Update To Database

A method for the generation, application, adaptation and use designed to extract knowledge from a collection of information;

2. Querying, Analysis, Results & Comparison

A database is used as a repository for results of the process as they are collected from the application of algorithms and analytical processing.

Generation & Application of Algorithms

Table 1 below illustrates how a matrix is used to generate useful combinations of data to aid designing algorithms useful for the process of automated analysis.

TABLE 1

| | Data Categories | | | | | | |
|---|---|---|---|---|---|---|---|
| | A | B | C | D | E | F | G1...n |
| A | | | | | | | |
| B | | | | | | | |
| C | | | | | | | |
| D | | | | | | | |
| E | | | | | | | |
| F | | | | | | | |
| G1...n | | | | | | | |

The Matrix acts as a 'Strategic Template' for the generation of queries and algorithms in the form of sub sets of queries and algorithms based on simple and complex combinations. This is automated but can be manipulated manually. Different combinations of rows and columns provides for different queries. Different problems require different combinations of queries and algorithms. The 'Strategic Template' acts as an organizing mechanism for sub sets which are referred to as 'Sub Templates or clusters and refer to sets of useful algorithms. The results of analysis from each 'Sub Template or cluster algorithms can be compared with others in order to optimise the results and knowledge gained from the analytical process. Results can be graded statistically and visually. A computer model encodes each potential combination and takes inputs to produce outputs. For example, the generation of clusters is determined by this process. Different levels of outputs can be requested and then assessed. The process uses the execution of cyclical algorithms. The outputs can then in turn produce new inputs. The 'degree of smoothness' achieved in the 'curve of uncertainty' concerns how rapidly the function adapts to produce useful outputs. The methodology and system responds strongly to quite small changes in inputs and so fine adjustments can be made. Improvement and regression in terms of outputs can thus be manipulated for best results.

This process allows the levels of uncertainty in the data to be reduced given different types of problems and contexts that require solutions. Results of this process can be used to design new algorithms and sets of algorithms for new cyclical analytical processing of the same data. In this way the system uses feedback loops to generate dynamic and adaptive analysis. Sources of uncertainty in the database of information are therefore:

1. Recognised;
2. Quantified;
3. Graded and presented for assessment.

This aids effectiveness assessments of the data model in the Knowledge Base, effectiveness of model predictions and give indications about how best to use the data and algorithms resulting from the 'Strategic Template' or cluster. Internal parameters of the data model, the initial conditions involved in collection of data, input types, model structure, observational error and bias and code uncertainty are all made easier to manage.

It will be understood the particular problem when identifying irregular connections in a database is generally the size of that database but potentially more significantly the nebulous nature of potential irregularities which require further investigation. In these circumstances, a number of distinct phases must be performed with respect to arranging investigation of the database. These phases are outlined below.

The first phase is to gain a detailed understanding of the problem domain by the discovery of static and dynamic models. The result is a digital representation of the problem domain that is used to crystallise what is known and to serve as a stimulus for dynamic iterative discovery.

The dynamic model captures the behaviour inherent within the problem domain, this will focus on the likelihood of fraudulent or irregular connection. It will identify the key steps involved as well as the information (sets) required at each step. The static model captures the key static relationships between the major information sets within the problem domain. The static model will also capture the cardinality of these relationships, (together with threshold levels of legitimacy) and the identification of information sets that are significant in the identification of fraud.

The construction of these models is both incremental and iterative. That is, the models are revisited as and in the light of knowledge as links are discovered. This new knowledge is used to generate new enquiries that result in new knowledge and the process iterates until the analysis is at a reasonable level of completeness. The methodology enables a greater degree of analysis and discovery than would otherwise be the case.

Two of the main techniques used to aid in the discovery process are use cases and the use of semantic driven, knowledge aggregation and disaggregation and testing. This aggregation and disaggregation of knowledge centres around determining different classes, typologies and taxonomies of the following: who, when, why, what, how and when. It also takes account of semantic issues as (1) Motivation (2) Opportunity (3) Mean.

Knowledge is then aggregated under each of these categories to support an overall proposition of fraudulent or irregular links.

These models are used to underpin the rest of the analysis in accordance with the present invention arrangement and method. They provide a common reference point and a standard problem domain vocabulary and taxonomy.

Analytical Questions

Armed with the static and dynamic models described above a set of questions or putative links are generated that will be useful in the discovery of knowledge (the knowledge being inline with the project objectives). These questions fall into three main questions.

Question or putative link classification 1: These types of questions are applied to the entire database (potentially millions of items of information and relationships). They aim to discover knowledge of interest via the reduction of complexity and uncertainty in the entire dataset down to smaller amounts of information that are of significant interest to the client. These can be generated incrementally as described to an acceptable level of epistemology. That is, a level and scope of the nature, capacity, and sources of knowledge needed to answer the problem. This allows us to move from a macro to a micro view (and back again) of relevant data instantaneously. A matrix-based technique is used to identify candidate questions, a short example is given below.

|         | PERSON | ADDRESS | PHONE  | POLICY | BANK ACC |
|---------|--------|---------|--------|--------|----------|
| PERSON  | XXXXXX | YES     | YES    | YES    | YES      |
| ADDRESS | YES    | XXXXXX  |        |        |          |
| PHONE   | YES    |         | XXXXXX |        |          |
| POLICY  |        |         |        | XXXXXX |          |
| BANK ACC|        |         |        | YES    | XXXXXXX  |

This matrix shows the simple questions that can be asked to discover knowledge from the underlying data. In the example above we see a YES between PHONE and PERSON. This would have been identified in the domain modelling phase above as a key relationship along with the warning and alert thresholds for the relationship cardinality. By applying this question across the model we could instantly identify investigative starting points by highlighting only those relationships that fail the alert threshold. This would show (in this case) all mobile phones and people, where the same mobile phone is associated with multiples of people.

Question classification 2: Based upon the question matrix above it is possible to formulate aggregate questions that use a combination of the individual questions highlighted above. The questions would be combined by standard Boolean logic operators using standard operator precedence rules. Allowing questions to be aggregated in this manner allows for the definition of highly powerful rules and strings of rules and algorithms.

Question classification 3: Using the relationships defined within the static model it is possible to generate questions (or algorithms) that recursively investigate the relationships between entities in order to discover knowledge. This is a very powerful means of questioning that is not provided in traditional relational models. It allows each case to be assessed both individually, and in the context of all the information directly and indirectly related to it. This form of questioning allows areas of interest to be highlighted based upon their relationship proximity to other significant entities and templates of link based fraud. Using this form of questioning it is possible to replace many hundreds of individual questions with one question of this type. The benefit is to be found in the way this methodology identifies issues of interest that would not be identified using traditional Boolean approaches.

Key to the present method and arrangement is the management of complexity and the reduction of entropy. One key step along this road is the generation of meaningful networks within the database. The knowledge may consist of millions of entities with millions of relationships between them. Understanding what these entities and their relationships mean is impossible for a human when these kind of numbers are involved. Thus, technically structuring the entity database for convenient analysis is essential.

The approach uses the concept of gateway nodes as a means to generate smaller more manageable networks of entities. A node type (a person, a telephone or an address for example) can be defined as a gateway node type. In general, all significant entity types will be gateways. When a given node type is assigned as a gateway node, and the networks generated, it is impossible for an individual instance of that node type to exist in more than one network.

The analysis will (based upon a detailed understanding of the static and dynamic models) identify and document the first analytical level of gateway node types. The analysis will also assign a weighting to the relevance of each gateway node in the process of achieving the objectives of finding irregular links. These first cut gateway node types feed as input into the following phases where they act as an input into the actual generation of networks.

Phase 1 (relevance modelling) focuses upon gaining a detailed understanding of the problem domain. At the end of this phase we understand how, or possibly how, the fraud (for example) is perpetrated, what data is key to analysis, how this data is related together and what questions we need to ask of the data to highlight the knowledge we are interested in. The work in phase one is logical, that is, the products are intellectual models of how we should proceed. The purpose of the second phase is to physicalise this logical regime of investigation.

It is necessary to generate a knowledge model that is used to store the actual data to be analysed as well as the meta-data defined within Relevance Modelling deduced from the first phase. The meta-data comes from the static model and relates to the actual entity types, the allowable relations between the entities, relationship cardinality, normal-warning-alert thresholds etc. The knowledge model must enforce the rules defined in the meta-data in respect of the data being analysed. That is, each entity to be analysed must have an entity type, it can only be directed related to entities of the types defined within the static model and so forth.

The product of this step is a single, consistent and consolidated knowledge model storing all of the information necessary to achieve the objectives of the project, together with rules that enforce the consistency of this data. The knowledge model is structured in such a way as to aid the detailed deep analysis of the entities it contains using the methodology described here.

It is necessary to define and implement a way of asking the questions identified in relevance modelling against the entities and relationships stored within the Knowledge Model. These rules would be described in a standard syntactically defined language. This would allow the physical embodiment of rules to be achieved in a standard manner.

Due to the naturally occurring complexity inherent in vast networks of related information it is necessary to organise this information in such a manner that it can be understood. The way the data is organised must enable the analysis to gain both a macro and micro understanding of the data, that is to say, to be able to understand the low level relationships between the entities, how an individual group of entities fit into the whole dataset and how the whole dataset itself is constructed.

To achieve this the method uses a gateway driven approach to the generation of hierarchical clusters. This approach decomposes the mixed mass of information we start with into highly cohesive and loosely coupled networks at different levels of abstraction (depths in the hierarchy).

Each network or cluster will contain a set of closely related entities (high cohesion). Each cluster may then be linked to other clusters by linking entities (the coupling between networks). A linking entity is a non-gateway node that exists between two or more networks. In effect, this linking entity is the bridge that can be used to aggregate these sub networks (clusters) into a single larger network (up to the whole database). As a result, clusters can also be linked horizontally.

This approach manages complexity by providing a cluster-based decomposition of the data and by providing context (by way of clusters) for each individual entity. At the top of the hierarchy we have a very simple view of the data, just the unique networks (worlds) that compose the dataset. Under each world we have a set of top-level clusters and the simple relationships between them. Within each top-level cluster we may have a set of top-level clusters and the simple relationships between them. Within each top-level cluster we may have a set of sub-clusters and the relationships between them. In turn, each sub-cluster will either contain other sub-clusters or actual entities and so on.

It should be noted that the gateway nodes selected as a basis for network generation will determine what networks are generated. For example, selecting gateway nodes A B and C will almost certainly generate a different set of networks to selecting A G and T as the gateway nodes. The first cut-out gateway node types are determined during Relevance Modelling and are refined by the iterative procedure of generating the optimum networks (Phase 1).

Each analysis is different, the data analysed, the exact and irregular links or fraud and the questions to ask etc. As a result, the ideal networks required for one analysis may be different for a different analysis (even when you are analysing the same data). The reason for this is that the objectives of different analysis vary. For one analysis the objective may be to identify trends across the whole dataset, or looking to identify key players through the whole dataset. In this scenario a small number of large clusters would suffice. However, for an analysis that requires the detailed analysis of each and every piece of information in the dataset, it may be necessary to have a high number of smaller clusters.

For each specific analysis the approach should be to define criteria that define the nature of the clusters that are required. The following information could be included;

| TYPE | DESCRIPTION |
|---|---|
| Min clusters | The minimum number of entry clusters allowable |
| Max clusters | The maximum number of entry clusters allowable |
| Min top-level clusters | The minimum number of top-level clusters a world must break down into. |
| Max top-level clusters | The maximum number of top-level clusters a world can break down into. |
| Hierarchy Depth | The maximum hierarchy depth to allow |
| Max Leaf Cluster Size | The max number of nodes that can exist within a leaf cluster. |
| Ordered list of available gateway node types | A list of all possible gateway nodes types for entry cluster relevant for this analysis. These should be ordered in terms of a weighted preference, the most relevant at the top and the least at the bottom. |

These variables set the constraints that govern the generation of the hierarchical network of clusters. The method will only allow the generation of optimised networks that meet these criteria.

The method uses the criteria defined above to act as constraints for the generation of the optimised hierarchical networks of clusters.

The matrix below shows how this would work for a dataset with five gateway entity types (A to E) where a hierarchy depth of 4 is selected.

| Optimised Hierarchical Network Generation Step 1 | | | | | |
|---|---|---|---|---|---|
| | TYPE A | TYPE B | TYPE C | TYPE D | TYPE E |
| WORLD | YES | YES | YES | YES | YES |
| TLC | YES | YES | YES | YES | |
| SUB-1 | YES | YES | YES | | |
| SUB-2 | YES | YES | | | |

(types A-E are arranged with A as most relevant and E as least)

The following process would occur.
1. Generate the clusters based upon all entity gateway nodes. This would generally result in a small number of unique worlds, each containing a large number of entities
2. Generate new clusters within the world based upon a sub-set of the entity gateway nodes (A to E). This would generate a number of smaller clusters within each entry world.
3. If these links did not meet the defined criteria they would in-turn be broken down into smaller sub-cluster networks using a subset of the gateways node types used to generate the links.
4. If these SUB-1 networks did not meet the defined criteria they would in-turn be broken down into smaller sub-cluster networks using a subset of the gateways node types used to generate the SUB-1 networks.
5. If the final SUB-2 networks did not meet the criteria then the pattern used for the gateways nodes (see table above) would be abandoned. If they passed however, this would be saved as a viable hierarchy of optimised clusters.

The process would continue to repeat to find all of the patterns for the potential optimised clusters. The method states that each time a pattern is found to either pass or fail the tests then a new pattern is generated and tested and so on, until all patterns have been exhausted.

New patterns are automatically generated by testing all of the possible combinations of gateway node types at each level of hierarchy. New patterns would be tried that reduced the number of gateway nodes one level at a time.

Gateway nodes are always turned off from the right hand side of the matrix, not the left. This way the highly relevant gateway node types are only turned off as a last resort.

After the matrix above had been tested, the next pattern generated would be . . . .

| | TYPE A | TYPE B | TYPE C | TYPE D | TYPE E |
|---|---|---|---|---|---|
| WORLD | YES | YES | YES | YES | YES |
| TLC | YES | YES | YES | YES | |
| SUB-1 | YES | YES | YES | | |
| SUB-2 | YES | | | | |

After this, the next one would be . . . .

| | TYPE A | TYPE B | TYPE C | TYPE D | TYPE E |
|---|---|---|---|---|---|
| WORLD | YES | YES | YES | YES | YES |
| TLC | YES | YES | YES | YES | |
| SUB-1 | YES | YES | | | |
| SUB-2 | YES | | | | |

And then

|       | TYPE A | TYPE B | TYPE C | TYPE D | TYPE E |
|-------|--------|--------|--------|--------|--------|
| WORLD | YES    | YES    | YES    | YES    | YES    |
| TLC   | YES    | YES    | YES    |        |        |
| SUB-1 | YES    | YES    |        |        |        |
| SUB-2 | YES    |        |        |        |        |

And so on and so forth.

The analysis will review the hierarchical networks that met the criteria and will after due consideration select the most appropriate one (generally, this will be the one with the highest proportion of gateway nodes turned on).

During relevance modelling a static model was developed that defines the entity types and how they can be related. The static model also defines relationship cardinality and thresholds for relationship warning and alerts.

Warnings and alerts provide excellent starting points for knowledge discovery. After the analysis has selected the most appropriate optimised hierarchical network to work with the method states that the Warnings and Alerts should be generated.

To achieve this, all relationships for each and every entity are compared against these thresholds. Any that fail are stored within the relevant bin (either as an alert or a warning). These signals from the dataset are then made available stating what the identified issue was, together with details of the case and details of the network the case resides in.

Final phase analysis can involve three main types of analysis. Some are aimed at understanding macro issues (big picture understanding) whilst others are used to understand individual cases in the context of their relationships. These forms of analysis are complementary not mutually exclusive. That is, big picture questions may be used to find attractive starting points from where to analyse in detail individual cases. It should be noted that although these types of questions are portrayed in this document as steps they are not applied as such. These forms of questioning will be used in combination and the results from one form of questioning will influence the next series of questions and so on. Iterating between macro and micro views allows the process to proceed in highly effective ways.

Depending upon the analysis required, all or only some of these types of questioning will be applied.

Firstly, there are macro question types relating to question classifications 1 and 2 as defined in relevance modelling. Here, knowledge is discovered by the application of complex algorithms (or combinations of algorithms) across the entire dataset. This may be to either to gain a better understanding of the structure and key relationships within the data, to identify key entities within the data, or to provide a starting points from which detailed investigation can commence.

Secondly, there are micro level question types that relate to question classification 3 as defined in relevance modelling and also to the visual surfing of networks. Information on how category 3 questions are applied is given in the relevance-modelling phase.

Visual surfing of the networks enables a trained analyst to interact with the dataset in a highly effective manner. The heuristic approach of the analysis and extremely high capacity of technology mean that the analysis can engage in an investigation via multiple interactions with the data within the network and to different levels of granularity or hierarchy depth. The analysis will use the visualisation technique to ask these questions and navigate through the resulting entities and networks.

As the results of questions (and sets of questions) are analysed the results will be connected with the entity, sub-set of entities or cluster within the knowledge model. Therefore, results of "questions" can be reviewed at any time, or when viewing an individual entity, sub-set of entities or a cluster any results that affect them can also be viewed.

In addition, an analyst can add comments and annotations to an entity, sub-set of entities or a cluster. Again, these are stored within the knowledge model and can be viewed at any time.

Storing results and analytical comments/annotations within the knowledge model provides centralised knowledge store which evolves over time. This centralised knowledge store can then be used at a later time to automate the generation of results and reports.

As questions are asked, manual analysis conducted etc., the knowledge model changes overtime. New knowledge is discovered which identifies new questions to ask and the iterations continue.

A natural consequence of the present expressive description of the method in written form is that it appears to be entirely sequential in its application. This is not the case. The method is incremental and iterative. As new knowledge is discovered at any given point in the process, it alters our understanding and our perspective. Therefore, it may be necessary to revisit previous phases and so the form of clusters and sub-clusters to make changes in the light of our new understanding.

In effect, we start with a limited amount of knowledge regarding the problem domain and conduct a degree of analysis on this basis. What we learn from this first increment allows us to iterate over the method another time to discover more knowledge. This analyse a little, learn a little, revise a little and repeat process allows us to rapidly gain a detailed understanding of the problem domain. With this understanding comes knowledge.

From the above it will be appreciated that the present method and arrangement comprises the structuring of a database based upon gateway and subsequent nodes in order to generate more digestible related information chunks rather than individual elements and information. Furthermore, these information chunks are defined by nodes from an entry node at a macro level which defines a primary world or cluster and then subsequent nodes within that cluster for further breakdown of the information in terms of manageable and digestible information chunks for more intense analysis. The purpose is to enable a vast array of information sources to be analysed in order to identify those links which are highly irregular or consistent with fraudulent activity. For example, it would be highly unusual for one bank account to pay the premiums for insurance purposes in the name of a large number of people, but it is possible if those people are all linked by a common employer who pays their car or health insurance. In such situations, with many millions of policies, previous systems would have been compromised by attempting to differentiate between the legitimate activity of an employer paying his or her employees insurance policies and a potential fraud for tax or other claim based activities by an individual. It should be understood that these policies may be as a result of identity theft so that the real persons are not aware of the policy in their name, the policy is paid for by the individual bank account or limited number of bank accounts with all proceeds directed to another account in the name of the fraudster.

A primary gateway node for a principal cluster may take the form of a high level piece of information such as an individual's name, address, telephone number, national insurance number or registration or policy. In such circumstances the data will then be analysed whereby from say an initial individual's name, leaks are established until a link to the gateway node is established. This cluster of information will then be assigned to that gateway node cluster and processing further performed for other members of the cluster throughout the whole database or if for a sub-cluster within the primary cluster set already established. As indicated the objective is to achieve manageable information chunks in the form of clusters for more detailed investigation and analysis. Thus, continuing with the example above for a single bank account gateway node criteria, it is likely that a relatively large number of members of that cluster will be identified including legitimate and illegitimate activities such as an employer paying employees policies or a parent paying the policies of their children, or as indicated fraudsters paying a number of policies in order that a mass of highly lucrative claims can be made upon those policies at a later date. In such circumstances, in a subsidiary gateway node for sub clusters, it is established that each member of the cluster includes a common single bank account for multiple policies thus further gateway nodes are necessary such as a common address or telephone number, but on this level only members of the primary cluster are checked for links and so the process should be performed in a far quicker timeframe. In such circumstances, once established there are links for each member between information on two levels rather than one, and therefore a much reduced number of members in each cluster will be identified, but still potentially relatively high member densities may be achieved particularly if an area code or similar partial telephone number is utilised as the gateway node for the sub cluster, that is to say establishing links within a geographical area through telephone number association or potentially purchase of possibly a large number of consecutive mobile phones by the fraudster. For example, this could go further by the search for networks of links between individual numbers dialled, calls received and between various phones. This process may reveal persons or addresses, vehicle or bank accounts for further micro or macro analysis.

If necessary, further sub-sub-cluster gateway node links will be utilised in order to establish a sub-sub-cluster, with again lower member levels to limit the number of detailed investigative analysis required on each member of that cluster for fraudulent or irregular linkage. It will be appreciated that a sub-sub cluster will have three levels of linkage, e.g. common bank account for multiple policies, common telephone number for common bank accounts and common policy number so that this sub cluster would identify that the particular policy is associated with a bank account which is paying for a number of insurance policies, and to a telephone number which is associated with a number of insurance policies and the coincidence merits further detailed personal investigation. Thus, the range of potential detailed investigation is reduced to a manageable level for the resources available.

Clearly, some links are to be expected, thus for example with regard to a claim on the above described insurance policy, it is to be expected that the insured's name and address will be linked with the policy, but then through the sub-sub cluster as described above, if the claimant's name and address falls within that sub-sub cluster a warning or alert is to be expected. Thus, for example, if such additional information such as a claimant's telephone number, address or name is deduced at a later date, that is to say when there is a claim upon the insurance policy or an individual telephones an insurance company, and through digital technology it is possible to retrieve the telephone number upon which the insurance company is called rather than the number inserted into the claims form/insurance application form, it is then possible to update incrementally the individual cluster, sub cluster or sub-sub clusters either in real time or data expansion steps in order to further refine the process for noting cluster linkages. It would be unusual for two otherwise remote people, that is to say the claimant and the insured, to be linked by the present cluster cascade structure.

In accordance with the present invention, by creating the initial cluster, sub cluster and sub-sub cluster, etc as a cluster cascade, it will be appreciated that individual population member numbers for each cluster, sub cluster or sub-sub cluster, etc is determinable. Then by returning to the expected modus operandi of irregular or fraudulent linkage, it is possible to choose either from the range of available clusters, sub clusters or sub-sub clusters, etc the most efficient method of defining those members of the sub-sub cluster which require in depth investigation. This approach provides uncertainty to the potential perpetrator of an irregular or fraudulent activity in that they will not be fully confident as to the particular cluster, sub cluster or sub-sub cluster that the investigator will utilise in order to identify their irregular or fraudulent activity. Furthermore, by structuring the database in the form of clusters, sub clusters and sub-sub clusters, it will be appreciated that in comparison with previous arrangements, iterative investigation and addition of further definable linkages as indicated above with respect to subsequent claims in a policy or further information intuitively deduced through investigation or otherwise, e.g. telephone number deduced from network interrogation can be utilised in order to further focus activities upon those members of sub-sub clusters which are the most likely indicators of irregular or fraudulent activity. Thus, even situations where it is noted an individual regularly claims upon their household insurance at relatively consistent time periods may be utilised in order to further identify fraudulent activity in terms of claims or possibly in relation to a particular insurance broker or patterns deduced with respect to claims submissions by geographical area in view of environmental damage, e.g. by comparing the number of buildings claims for the same policy or individual when subjected to substantially the same claim conditions, e.g. flooding, etc.

Generally, the database structure in accordance with the present invention as indicated will take the form of clusters, sub clusters and sub-sub clusters with further clustering to appropriate hierarchical depths as required or necessary and as part of an incremental and normally iterative, adaptive cyclical process.

In such circumstances, the database structured in terms of the clustering as defined may be utilised in itself to provide relative probabilities and likelihoods and associations with respect to activities under certain cluster scenarios and conditions. In such circumstances, for example, an insurer or other predictor of trends may utilise such clustering with regard to costings or provision of services, etc., and decision making.

The present arrangement and methodology can be utilised with respect to a wide range of situations such as those indicated with respect to insurance fraud or identity theft or provision of services or goods transactions and those data relationships contextually relevant. Essentially, the process depends upon identifying unusual or irregular links which may be fraudulent as a basis for more clearly identifying those transactions or individuals or policies, etc which require further in depth interrogatory analysis rather than passive analysis through submitted data from the individual, etc. There are limited sources available for such interrogatory analysis and therefore by the present arrangement and methodology, such resources can be more accurately and therefore more effectively employed to identify irregular or fraudulent activity, etc.

The present invention may be used in determination of fraud and other illegitimate activity relating to use of mobile phone or car insurance or personal accident insurance, but these are simply examples of potential applications.

DETAILED DESCRIPTION

Figure 1:
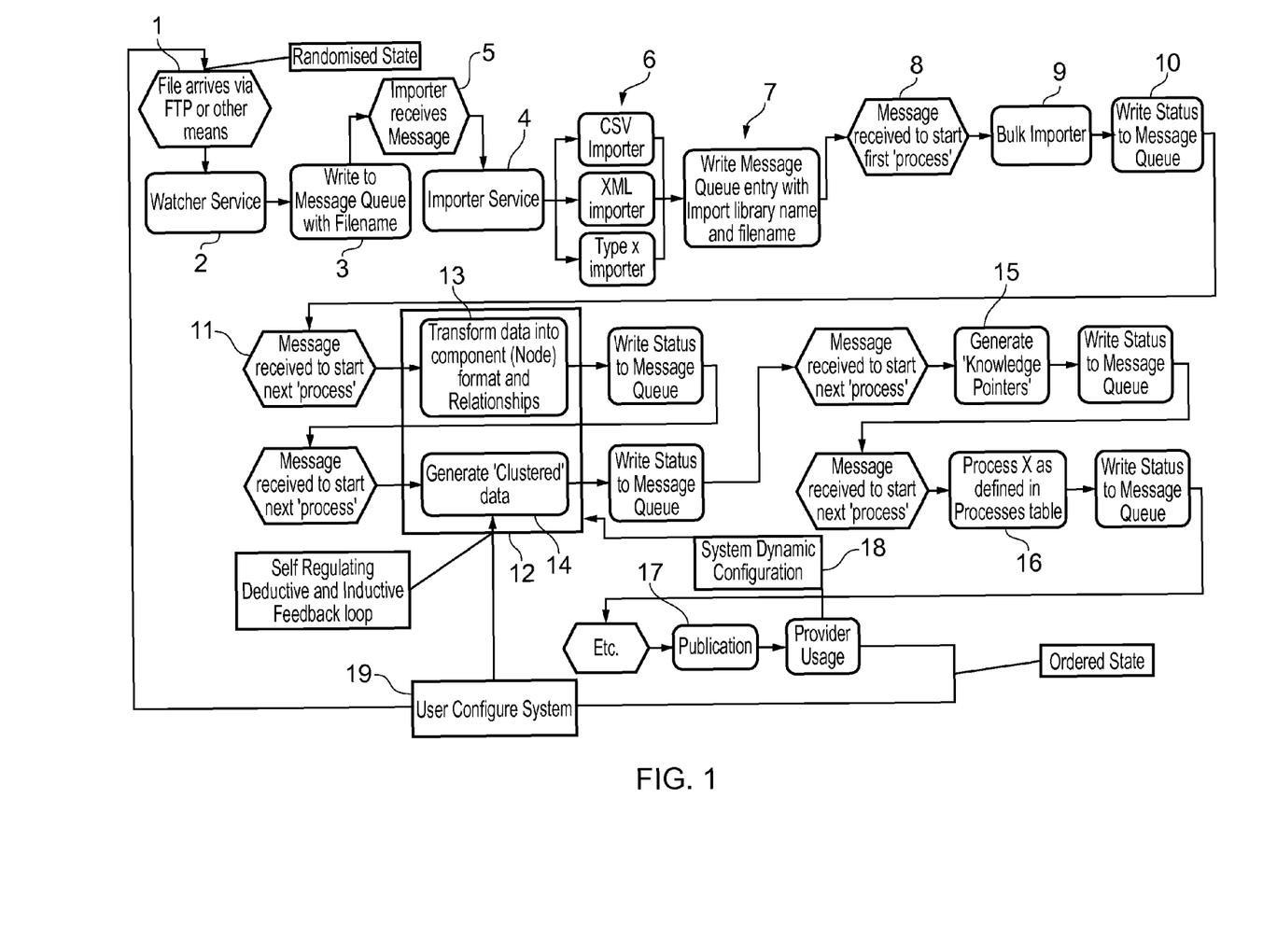
FIG. 1 is a block diagram illustrating an information processor arrangement.

FIG. 1 illustrates a typical information processor arrangement in the form of processor steps in order to provide information in an appropriate form for analysis. The technique for analysing the information in order to identify irregular links is generally as outlined above, thus an information dataset 1 arrives at watching service 2 in an as presented state. This watching service 2 provides a name to the information dataset at processor stage 3 so that an importer service 4 appropriately receives that dataset for analysis via a communication link 5. The database is then analysed for typical identifier legends in a process stage 6 such that the subsequent analysis can be appropriately entered in a queue and given a library name/file name within the processor arrangement at stage 7. Subsequently at stage 8 the dataset is retrieved from the library in order to start the process 8 to transfer the data into an appropriate bulk importer collator at stage 9 and indicate status in a message queue at stage 10.

In the above state upon receipt of the first message requesting analysis at stage 11 the information is oscillated through a processor group 12 where the information is transformed into component (node) format with interrelationships in a comparator stage 13 and subsequently clustered data in the form of interrelationships at stage 14. The data is essentially nibbled in appropriate chunks for generation of the nodes and the clusters. Once an appropriate cluster set is identified, the next stage of the process, as indicated above, is to identify knowledge pointers, such as telephone numbers or truncated or indirect or partial links which may be in the form of a cascade which will allow comparison of clusters. In such circumstances, as indicated above, for example use of the same telephone number in making several insurance claims may be a knowledge point being utilised to identify potential irregular relationships in connection. The technique of creating clusters which can be analysed through appropriate knowledge pointers at stage 15 and then through a subsequent weighting process 16 identifying those irregular relationships of most concern allows publication of the relationships and data clusters of most concern for more detailed analysis. Thus publication 17 creates a data string which is in an ordered state for analysis. This ordered state will allow dynamic configuration both of the node/cluster process 12 through a dynamic configuration adjustment 18 or both of this process 12 as well as the actual dataset input 1 through a user configuration system adjustment 19.

Clearly, the information processor arrangement in accordance with the present invention is dependent upon processor speed with regard to analysis of datasets. If that processor speed is sufficiently quick it will be understood that comparison of datasets approaching real time may be achieved. In such circumstances fraudulent use of mobile telephony or other similar devices may be effectively barred. For example, if the same telephone number is used to make so called "card holder not present" transactions with a credit card or debit card it will be clearly understood that there will be the potential for an irregular connection or relationship which should be more closely investigated and highlighted so that the card issuer or other authority can request further checks before proceeding with the transaction. It will be company using their works telephone number or call box at that works, but in such circumstances through the appropriate clustering of the present information processor arrangement this legitimate cluster may diminish the significance of the irregularity of the multiple card use of the same telephone number. The desire is to ensure the potential for fraudulent use etc., is diminished by highlighting the more significant irregular relationships for appropriate analysis in the vast number of transactions or data retrievals probable.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An alert generator comprising a processor and a memory storage device incorporating instructions which when uploaded into the processor device enable performance of: collecting information comprised of many different variables; defining constraints that govern the generation of a hierarchical network of clusters from the information; then generating an optimised hierarchical network of clusters that meets the constraints by
   repeatedly generating and testing different hierarchical networks of clusters by
   repeatedly: generating, at a first hierarchical level in the hierarchical network of clusters, clusters and generating, at a next lowest level in the hierarchical network of clusters, a number of smaller clusters as sub-sets of a respective cluster; repeatedly generating, at a next lowest level in the hierarchical network of clusters, a number of smaller clusters as sub-sets of a respective subcluster; if the defined constraints cannot be met, abandoning the hierarchal network of clusters as a viable hierarchy of optimised clusters; if the defined constraints are met, saving the hierarchal network of clusters as a viable hierarchy of optimised clusters;
   selecting from the saved viable hierarchies of optimised clusters a most appropriate hierarchical network of clusters as an optimised hierarchical network of clusters that meets the constraints;
after generating an optimised hierarchical network of clusters that meets the constraints, receiving further information by recording, through digital technology, a telephone number used to make contact and using the further information and the collected information to regenerate an optimised hierarchical network of clusters that meets the constraints; and assessing the regenerated optimised hierarchical network of clusters that meets the constraints to produce a warning or an alert.

2. An alert generator as claimed in claim 1, wherein the constraints define a minimum number of clusters in the hierarchical network of clusters.

3. An alert generator as claimed in claim 1, wherein the constraints define a maximum number of clusters in the hierarchical network of clusters.

4. An alert generator as claimed in claim 1, wherein the constraints define a minimum number of clusters at the first hierarchical level in the hierarchical network of clusters.

5. An alert generator as claimed in claim 1, wherein the constraints define a maximum number of clusters at the first hierarchical level in the hierarchical network of clusters.

6. An alert generator as claimed in claim 1, wherein the constraints define a maximum number of levels in the hierarchical network of clusters.

7. An alert generator as claimed in claim 1, wherein the constraints define a maximum number of nodes that can exist within a leaf cluster, wherein each node corresponds to an information chunk.

8. An alert generator as claimed in claim 1, wherein the warning or an alert is produced when the same mobile phone is associated with multiple people.

9. A method of alert generation comprising:
collecting information comprised of many different variables; defining constraints that govern the generation of a hierarchical network of clusters from the information; then
generating an optimised hierarchical network of clusters that meet the constraints by
repeatedly generating and testing different hierarchical networks of clusters until all patterns of hierarchical networks of clusters have been tested by repeatedly:
generating, at a first hierarchical level in the hierarchical network of clusters, clusters and generating, at a next lowest level in the hierarchical network of clusters, a number of smaller clusters as sub-sets of a respective cluster; repeatedly generating, at a next lowest level in the hierarchical network of clusters, a number of smaller clusters as sub-sets of a respective subcluster; if the defined constraints cannot be met, abandoning the hierarchal network of clusters as a viable hierarchy of optimised clusters; if the defined constraints are met, saving the hierarchal network of clusters as a viable hierarchy of optimised clusters;
selecting from the saved viable hierarchies of optimised clusters a most appropriate hierarchical network of clusters as an optimised hierarchical network of clusters that meets the constraints;
after generating an optimised hierarchical network of clusters that meets the constraints, receiving further information by recording, through digital technology, a telephone number used to make contact and using the further information and the collected information to regenerate an optimised hierarchical network of clusters that meets the constraints; and assessing regenerated optimised hierarchical network of clusters that meets the constraints to produce a warning or an alert.

10. A method as claimed in claim 9, wherein the constraints define a minimum number of clusters in the hierarchical network of clusters.

11. A method as claimed in claim 9, wherein the constraints define a maximum number of clusters in the hierarchical network of clusters.

12. A method as claimed in claim 9, wherein the constraints define a minimum number of clusters at the first hierarchical level in the hierarchical network of clusters.

13. A method as claimed in claim 9, wherein the constraints define a maximum number of clusters at the first hierarchical level in the hierarchical network of clusters.

14. A method as claimed in claim 9, wherein the constraints define a maximum number of levels in the hierarchical network of clusters.

15. A method as claimed in claim 9, wherein the constraints define a maximum number of nodes that can exist within a leaf cluster, wherein each node corresponds to an information chunk.

16. A method as claimed in claim 9, wherein the warning or an alert is produced when the same mobile phone is associated with multiple people.

17. An alert generator comprising a processor and a memory storage device incorporating instructions which when uploaded into the processor device enable performance of: collecting information comprised of many different variables; defining constraints that govern the generation of a hierarchical network of clusters from the information; generating an optimised hierarchical network of clusters that meet the constraints by
repeatedly generating and testing different hierarchical networks of clusters by
repeatedly: generating, at a first hierarchical level in the hierarchical network of clusters, clusters and generating, at a next lowest level in the hierarchical network of clusters, a number of smaller clusters as sub-sets of a respective cluster; repeatedly generating, at a next lowest level in the hierarchical network of clusters, a number of smaller clusters as sub-sets of a respective subcluster; if the defined constraints cannot be met, abandoning the hierarchal network of clusters as a viable hierarchy of optimised clusters; if the defined constraints are met, saving the hierarchal network of clusters as a viable hierarchy of optimised clusters;
selecting from the saved viable hierarchies of optimised clusters a most appropriate hierarchical network of clusters as an optimised hierarchical network of clusters that meets the constraints;
after generating an optimised hierarchical network of clusters that meets the constraints, receiving further information via digital technology, wherein the further information is associated with a telephone number, and using the further information and the collected information to regenerate an optimised hierarchical network of clusters that meets the constraints; and assessing regenerated optimised hierarchical network of clusters that meets the constraints to produce a warning or an alert.

* * * * *